(12) United States Patent
Oh

(10) Patent No.: US 12,085,806 B2
(45) Date of Patent: Sep. 10, 2024

(54) LIGHT GUIDE PLATE AND DISPLAY MODULE HAVING TRANSMISSIVE PART, AND GAME MACHINE HAVING SAME

(71) Applicant: TOVIS CO., LTD., Incheon (KR)

(72) Inventor: Chang Min Oh, Incheon (KR)

(73) Assignee: TOVIS CO., LTD., Incheon (KR)

( * ) Notice: Subject to any disclaimer, the term of this patent is extended or adjusted under 35 U.S.C. 154(b) by 85 days.

(21) Appl. No.: 17/926,626

(22) PCT Filed: Apr. 28, 2021

(86) PCT No.: PCT/KR2021/005345
§ 371 (c)(1),
(2) Date: Nov. 21, 2022

(87) PCT Pub. No.: WO2021/235720
PCT Pub. Date: Nov. 25, 2021

(65) Prior Publication Data
US 2023/0185130 A1    Jun. 15, 2023

(30) Foreign Application Priority Data
May 22, 2020   (KR) ........................ 10-2020-0061925

(51) Int. Cl.
*G02F 1/1335*      (2006.01)
*G07F 17/32*       (2006.01)
(52) U.S. Cl.
CPC .. *G02F 1/133607* (2021.01); *G02F 1/133531* (2021.01); *G07F 17/3213* (2013.01)

(58) Field of Classification Search
None
See application file for complete search history.

(56) References Cited

U.S. PATENT DOCUMENTS

| | | |
|---|---|---|
| 2004/0227286 A1 | 11/2004 | Tanimura et al. |
| 2005/0024555 A1 | 2/2005 | Shiraishi et al. |
| 2010/0103341 A1 | 4/2010 | Ota et al. |
| 2012/0206320 A1 | 8/2012 | Lee et al. |
| 2013/0135560 A1 | 5/2013 | Lee et al. |
| 2017/0153485 A1 | 6/2017 | Kim |
| 2019/0072822 A1 | 3/2019 | Yasunaga et al. |

FOREIGN PATENT DOCUMENTS

| | | |
|---|---|---|
| JP | 2005-056859 A | 3/2005 |
| JP | 2005-058754 A | 3/2005 |
| JP | 2005-152581 A | 6/2005 |
| JP | 2005-185826 A | 7/2005 |
| JP | 2007-033908 A | 2/2007 |
| JP | 2010-026022 A | 2/2010 |
| KR | 10-2011-0045766 A | 5/2011 |
| KR | 10-2020-0020241 A | 2/2020 |

OTHER PUBLICATIONS

International Search Report for PCT/KR2021/005345 mailed Aug. 27, 2021 from Korean Intellectual Property Office.

*Primary Examiner* — Richard H Kim
(74) *Attorney, Agent, or Firm* — Revolution IP, PLLC

(57) ABSTRACT

The present invention relates to a light guide plate including a plurality of cutting areas, the light guide plate capable of solving the problem of brightness degradation between the plurality of cutting areas by attaching a predetermined member, which is reactive to light, to at least one of the inner sides of the cutting areas.

9 Claims, 9 Drawing Sheets

LIGHT GUIDE PLATE AND DISPLAY MODULE HAVING TRANSMISSIVE PART, AND GAME MACHINE HAVING SAME

TECHNICAL FIELD

The present invention relates to a display module that displays an image and a game machine having the same, and more particularly to a display module including a cutting area (or a transmission portion) configured to allow an object disposed at the rear to be seen from the front therethrough and a game machine having the same.

BACKGROUND ART

In general, a display module is an apparatus that displays an image, and utilization of the display module is not high since the rear of the display module is not seen through.

In recent years, therefore, research and development on a display apparatus capable of simultaneously displaying a digital image formed by driving liquid crystals and a real object located opposite a liquid crystal panel on the same screen has been actively conducted.

As an example, a display configured such that a part of a screen is cut to allow an object disposed at the rear to be seen from the front is being developed.

In this case, a part of a backlight unit (BLU) disposed at the rear of a display panel must be cut. At this time, however, a light guide panel (LGP) configured to transfer light from a light source to the front must also be cut. As a result, a light transfer path is interrupted in a cutting area of the light guide panel, whereby light is not uniformly transferred to the front. That is, brightness of the cutting area and brightness around the cutting area become lower than brightness of the other areas. In particular, if a plurality of cutting areas is included, brightness between the cutting areas becomes much lower than brightness of the other areas. Furthermore, for a game machine using such a display (e.g. a reel game machine), a reel located at the rear of the display is seen through the cutting area, and the reel transmission area is relatively dark due to reduction in brightness, whereby it is difficult for a user to focus on a game.

In order to solve such a problem, conventional technology for forming a pattern on a light guide panel was developed. However, such conventional technology had problems in that expensive equipment is necessary and a complex processing procedure is performed.

DISCLOSURE

Technical Problem

It is an object of the present invention to provide a light guide panel including a plurality of cutting areas, wherein the light guide panel has a transmission portion configured such that a predetermined member configured to react to light is attached to at least one of inner surfaces of the cutting areas, whereby it is possible to solve a problem in that brightness of the cutting areas and brightness around the cutting areas are reduced, a display module including the light guide panel, and a game machine having the display module.

It is another object of the present invention to provide a light guide panel including a plurality of cutting areas, wherein the light guide panel has a transmission portion configured such that any one of a first member configured to prevent reduction in brightness of light and a second member configured to offset light that is excessively reflected while preventing reduction in brightness of light is selected and attached to an inner surface of each of the plurality of cutting areas, whereby it is possible to uniformly transfer light generated by a light source to the front, a display module including the light guide panel, and a game machine having the display module.

It is a further object of the present invention to provide a light guide panel including at least one cutting area, wherein the light guide panel has a transmission portion configured such that at least one of inner surfaces through which light emitted from a light emission portion provided outside the light guide panel is transmitted is processed to remove a hot spot generated during transmission of the light (e.g. etching or diffuser sheet attachment), whereby it is possible to maintain the state of a screen clean, a display module including the light guide panel, and a game machine having the display module.

Technical Solution

In order to accomplish the above objects, a light guide panel provided by the present invention has a transmission portion, wherein the light guide panel includes at least one cutting area configured to implement the transmission portion, and a predetermined member configured to react to light is attached to at least one of inner surfaces of the cutting area.

The light guide panel may include a plurality of cutting areas arranged in a line, wherein a first member configured to prevent reduction in brightness of light may be attached to a first inner surface of each of the cutting areas adjacent to another cutting area, among inner surfaces of the cutting areas, and the first member may be formed of any one of a tape, a sheet, and a film each having a material having a color configured to reflect light applied to opposite surfaces thereof.

In the light guide panel, a second member configured to react to light may be attached to a second inner surface of each of the cutting areas not adjacent to the other cutting area, among the inner surfaces of the cutting areas, and the second member may be formed of any one of a tape, a sheet, and a film each having a material having a color configured to reflect light applied to one surface thereof that faces the cutting area and a material having a color configured to offset light applied to the other surface thereof.

In the light guide panel, a diffuser sheet configured to remove a hot spot generated when light emitted from a light emission portion provided outside the light guide panel is transmitted through the inner surface of each of the cutting areas may be attached to at least one of the inner surfaces of the cutting areas.

In the light guide panel, at least one of the inner surfaces of the cutting areas may be etched to remove a hot spot generated when light emitted from the light emission portion provided outside the light guide panel is transmitted through the inner surface of each of the cutting areas.

In order to accomplish the above objects, a display module provided by the present invention includes a display panel configured to display an image, a polarization portion attached to the display panel, the polarization portion being configured to optionally transmit light depending on a vibration direction thereof, the polarization portion including at least one first cutting area cut such that the rear of the display panel is seen through the first cutting area, and a backlight unit configured to provide light to the display panel, the backlight unit including a second cutting area cut so as to correspond to the first cutting area such that the rear of the display panel is seen through the second cutting area, wherein the backlight unit includes a light guide panel, the light guide panel includes at least one third cutting area corresponding to the first and second cutting areas, and a predetermined member configured to react to light is attached to at least one of inner surfaces of the third cutting area.

Also, in order to accomplish the above objects, a game machine provided by the present invention includes a display module including a display panel configured to display an image, a polarization portion attached to the display panel, the polarization portion being configured to optionally transmit light depending on a vibration direction thereof, the polarization portion including at least one first cutting area cut such that the rear of the display panel is seen through the first cutting area, and a backlight unit configured to provide light to the display panel, the backlight unit including a second cutting area cut so as to correspond to the first cutting area such that the rear of the display panel is seen through the second cutting area, and a real game unit located at the rear of the display module, the real game unit being configured to provide a real game through the first cutting area of the polarization portion, wherein the backlight unit includes a light guide panel, the light guide panel includes at least one third cutting area corresponding to the first and second cutting areas, and a predetermined member configured to react to light is attached to at least one of inner surfaces of the third cutting area.

Advantageous Effects

The present invention, which relates to a light guide panel including a plurality of cutting areas, has an advantage in that a predetermined member configured to react to light is attached to at least one of inner surfaces of the cutting areas, whereby it is possible to solve a problem in that brightness of the cutting areas and brightness around the cutting areas are reduced.

In particular, the present invention has an advantage in that any one of a first member configured to prevent reduction in brightness of light and a second member configured to offset light that is excessively reflected while preventing reduction in brightness of light is selected and attached to an inner surface of each of the plurality of cutting areas, whereby it is possible for the light guide panel to uniformly transfer light generated by a light source to the front.

In addition, the present invention, which relates to a light guide panel including at least one cutting area, has an advantage in that at least one of inner surfaces through which light emitted from a light emission portion provided outside the light guide panel is transmitted is processed to remove a hot spot generated during transmission of the light (e.g. etching or diffuser sheet attachment), whereby it is possible to maintain the state of a display screen clean. Consequently, the present invention has an advantage in that the transfer state of light through the light guide panel is maintained uniform using a simple method at low cost, whereby it is possible to improve performance in operation of a display module used in a game machine, etc.

In addition, the present invention, which relates to a game machine (e.g. a reel game machine) having a light guide panel including at least one cutting area applied thereto, has an advantage in that it is possible to solve a problem in that the cutting area, through which a reel located at the rear of a display is seen, is relatively dark, whereby it is possible for a user to focus on a game.

BEST MODE

Figure 1:
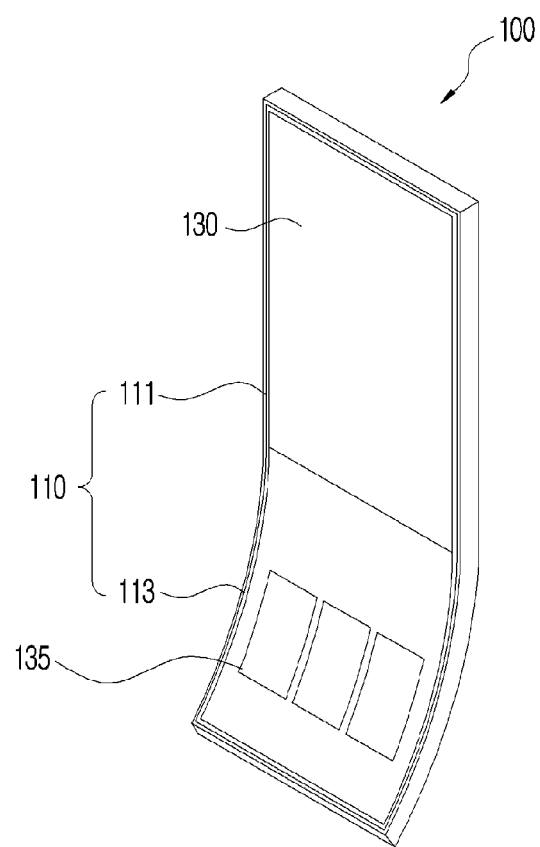
FIG. 1 is a perspective view showing a display module according to an embodiment of the present invention.

Hereinafter, embodiments of the present invention will be described with reference to the accompanying drawings, and the present invention will be described in detail to the extent to which a person having ordinary skill in the art to which the present invention pertains can easily implement the present invention. However, the present invention may be implemented in various different forms and is not limited to the embodiments described herein. Meanwhile, parts having no relation to the description of the present invention are omitted from the drawings in order to clearly describe the present invention, and similar parts are denoted by similar reference numerals throughout the specification. In addition, parts that can be easily understood by those skilled in the art even though a detailed description thereof is omitted will not be described.

When a certain part includes a certain component in the specification and the claims, this means that another component is not excluded but is further included, unless mentioned otherwise.

FIG. 1 is a perspective view showing a display module having a transmission portion to which the present invention is applied. Referring to FIG. 1, the display module 100 to which the present invention is applied may include a display panel 110.

The display panel 110 may be implemented by an LCD panel or an OLED panel. In FIG. 1, an example in which the display panel 110 is implemented by an LCD panel is shown.

The display panel 110 may include a first substrate, a second substrate, and a liquid crystal layer.

The liquid crystal layer may be located between the first substrate and the second substrate.

When the first substrate is a color filter substrate, the second substrate may be a TFT substrate.

The display panel 110 may include a flat portion 111 and a curved portion 113 continuously connected to the flat portion 111, although the display panel 110 may be flat.

In the example of FIG. 1, an upper part of the display panel 110 has a flat portion 111, and a lower part of the display panel has a curved portion 113 continuously connected to a lower end of the flat portion 111. However, the display panel may be formed so as to have various shapes. For example, curved portions 113 may be provided at opposite sides of a flat portion 111, or a curved portion 113 may be provided between a pair of flat portions 111.

Also, in the example of FIG. 1, the display panel 110 is provided at a front surface thereof with a polarization portion 130, wherein a polarization transmission portion 135 under the polarization portion 130 (i.e. the curved portion 113 of the display panel 110) such that the rear of the display panel is seen through. That is, the polarization portion 130 transmits only light that is vibrated in a predetermined direction, whereas the polarization transmission portion 135 is formed through a part of the polarization portion 130 such that all kinds of light are transmitted through the polarization transmission portion, whereby the rear of the display panel 110 is visible.

Figure 2:
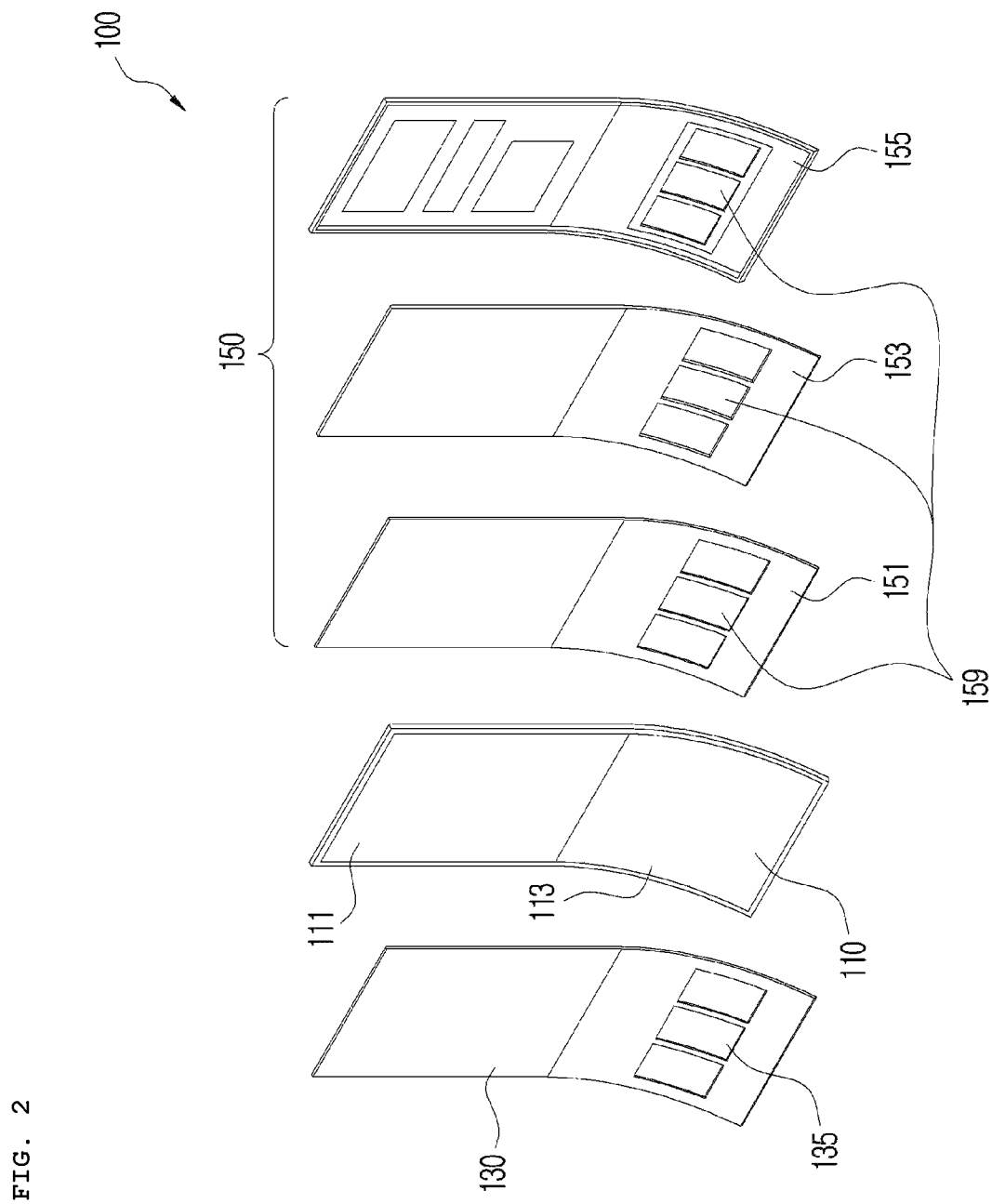
FIG. 2 is an exploded perspective view showing the display module according to the embodiment of the present invention.

FIG. 2 is an exploded perspective view showing the display module according to the embodiment of the present invention. Referring to FIG. 2, the display module according to the embodiment of the present invention is configured such that devices are attached to the front surface and a rear surface of the display panel 110, wherein the polarization portion 130, described with reference to FIG. 1, is attached to the front surface of the display panel 110, and a backlight unit 150 is attached to the rear surface of the display panel 110.

The backlight unit 150 may include a light source, a diffuser panel 151, a light guide panel 153, and a back cover 155.

The light source, the light guide panel 153, and the diffuser panel 151 may be received in the back cover 155, which may be formed so as to be open at a front surface thereof. In addition, the back cover 155 may be formed so as to have a size corresponding to the size of the display panel 110 such that the display panel 110 can also be received in the back cover, and a reflector panel configured to reflect light from the light source in a direction in which the display panel 110 is located may be installed at the back cover 155.

The light source may be constituted as the result of a plurality of LEDs being mounted on a circuit board. The light source may be installed at the rear of the back cover 155 to provide light to the display panel 110 located at the front of the backlight unit 150, or may be installed around the back cover 155 to provide light to the display panel 110 through the light guide panel 153, a description of which will follow.

When the light source is installed around the back cover 155, the light guide panel 153 may change the path of light generated by the light source in the direction in which the display panel 110 is located.

The light guide panel 153 may be formed so as to have a sheet shape, and may have a light guide pattern configured to change the path of light provided by the light source in the direction in which the display panel 110 is located.

The diffuser panel 151 may diffuse light provided by the light source and may provide the diffused light to the display panel 110. To this end, the diffuser panel 151 diffuses light provided through the light guide panel 153 and provides the diffused light to the display panel 110.

Meanwhile, each of the diffuser panel 151, the light guide panel 153, and the back cover 155, which constitutes the backlight unit 150, includes a plurality of cutting areas (backlight transmission portions 159) such that the rear of the display panel 110 is visible, wherein the plurality of cutting areas is formed at the position corresponding to the polarization transmission portion 135 formed at the polarization portion 130.

In order to solve a light blocking problem due to the plurality of cutting areas (backlight transmission portions 159) and to uniformly transmit light provided by the light source to the display panel 110, the light guide panel 153 may further include a predetermined member that reacts to light. That is, the predetermined member that reacts to light may be attached to each of inner surfaces of the plurality of cutting areas (backlight transmission portions 159) formed in the light guide panel 153. Examples in which the predetermined members are attached to the light guide panel 153 are illustrated in FIGS. 3 and 4.

Figure 3:
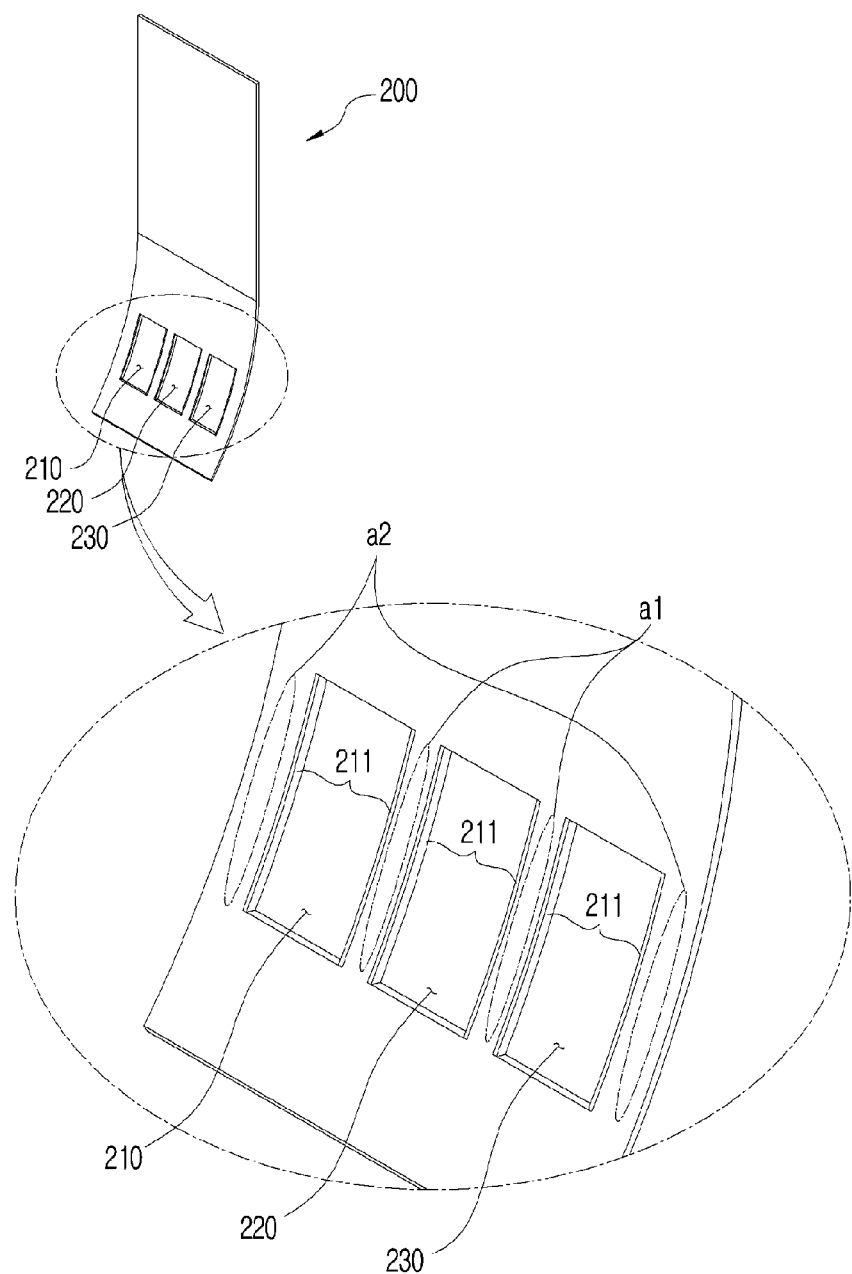
FIG. 3 is a perspective view showing a light guide panel according to a first embodiment of the present invention.
Figure 4:
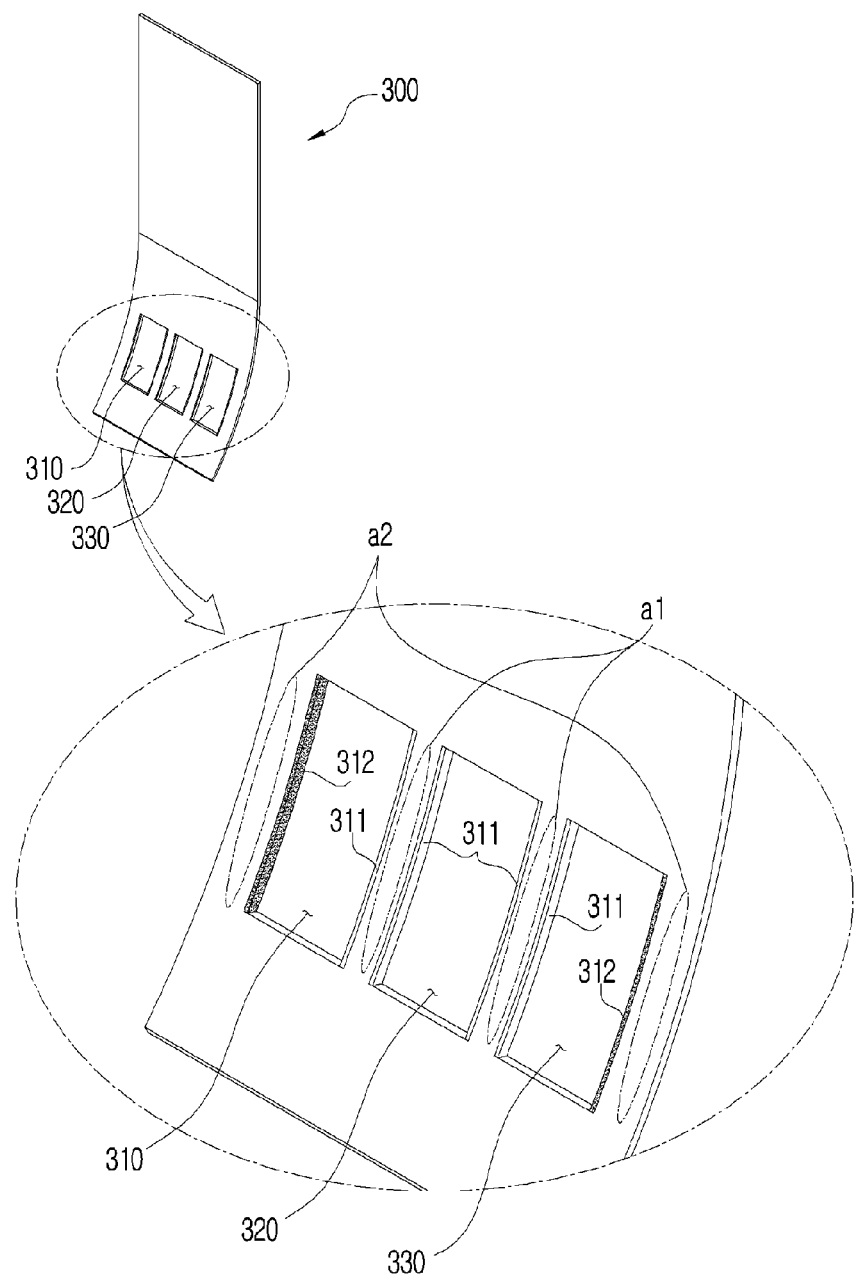
FIG. 4 is a perspective view showing a light guide panel according to a second embodiment of the present invention.

FIGS. 3 and 4 are perspective views respectively showing light guide panels according to first and second embodiments of the present invention. Referring to FIG. 3, the light guide panel 200 according to the first embodiment of the present invention includes three backlight transmission portions 210, 220, and 230 arranged in a line, and a predetermined member 211 that reacts to light is attached to each of inner surfaces thereof.

When two or more backlight transmission portions 210, 220, and 230 are formed in the light guide panel 200, as in the example of FIG. 3, light radiated from the light source to the light guide panel 200 is blocked by the backlight transmission portions 210, 220, and 230, whereby brightness of a transmission area of each of the backlight transmission portions 210, 220, and 230 and brightness of an area a1 between the backlight transmission portions 210, 220, and 230 become lower than brightness of the other areas. The predetermined member 211 is provided to solve the above problem.

To this end, the predetermined member 211, which is a reflector, may be implemented by a tape, a sheet, or a film, and may be attached to at least one of the inner surfaces of the three backlight transmission portions 210, 220, and 230. A coating solution having a color that reflects light may be applied to opposite surfaces of the predetermined member 211. For example, a white coating solution may be applied to the opposite surfaces of the predetermined member 211.

More preferably, a white reflector 211 having a white coating solution applied to opposite surfaces thereof is attached to left/right inner surfaces of each of the three backlight transmission portions 210, 220, and 230, whereby it is possible to solve a problem in that brightness of the transmission area of each of the backlight transmission portions 210, 220, and 230 and brightness of the area a1 between the backlight transmission portions 210, 220, and 230 are lower than brightness of the other areas.

However, if the white reflector 211 having the white coating solution applied to opposite surfaces thereof is attached to the left/right inner surfaces of each of the three backlight transmission portions 210, 220, and 230, as in the example of FIG. 3, an outside area a2 of each of the backlight transmission portions 210 and 230 adjacent to left/right light emission portions may be excessively brightened.

In order to solve the above problem, no white reflector 211 may be attached to the inner surface, adjacent to the outside area a2, of each of the backlight transmission portions 210 and 230 adjacent to the left/right light emission portions, or a member having another property may be attached thereto.

FIG. 4 is a view illustrating the second embodiment of the present invention, which solves the above problem. Referring to FIG. 4, the light guide panel 300 according to the second embodiment of the present invention includes three backlight transmission portions 310, 320, and 330 arranged in a line, and first and second members 311 and 312 that react to light are optionally attached to each of inner surfaces thereof.

The first and second members 311 and 312 are members having different properties in which the first and second members react to light, wherein the first member 311 has a property in which both surfaces of the first member reflect light and the second member 312 has a property in which one surface of the second member reflects light and the other surface of the second member offsets the reflected light. To this end, the first member 311 may be a first reflector having a coating solution having a color that reflects light (e.g. white) applied to opposite surfaces thereof, and the second member 312 may be a second reflector having a coating solution having a color that reflects light (e.g. white) applied to one surface thereof and a coating solution having a color that offsets light (e.g. gray) applied to the other surface thereof. In addition, each of the first member 311 and the second member 312 may be implemented by a gray tape, a gray sheet, or a gray film.

In order to solve a problem in that brightness of a transmission area of each of the backlight transmission portions 310, 320, and 330 and brightness of an area a1 between the backlight transmission portions 310, 320, and 330 become lower than brightness of the other areas, the first member 311 reflects light. In order to solve a problem in that an outside area a2 of each of the backlight transmission portions 310 and 330 adjacent to the left/right light emission portions is excessively brightened, the second member 312 reflects light to the transmission area of each of the backlight transmission portions 310 and 330 and offsets light reflected to the outside area a2.

To this end, the first member 311 may be attached to an inner surface of each of the backlight transmission portions 310, 320, and 330 adjacent to the area a1 between the backlight transmission portions 310, 320, and 330, and the second member 312 may be attached to the inner surface of each of the backlight transmission portions 310 and 330 adjacent to the outside area a2. At this time, the second member 312 is attached such that one surface of the second member having a coating solution having a color that reflects light (e.g. white) applied thereto faces the transmission area of each of the backlight transmission portions 310 and 330 and the other surface of the second member having a coating solution having a color that offsets light (e.g. gray) applied thereto faces the outside area a2.

Figure 5A:
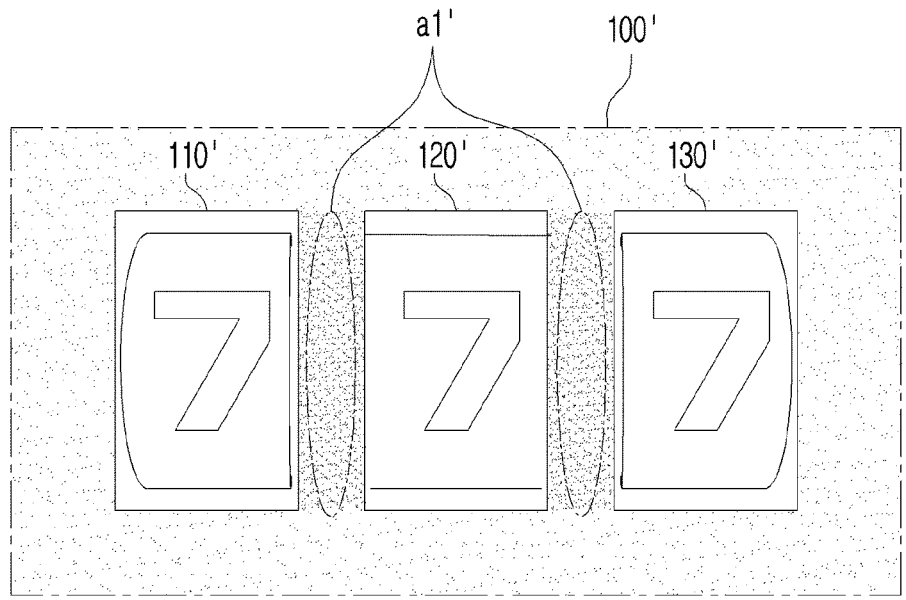
FIGS. 5A to 5C are views illustrating use examples of display modules having the light guide panels according to the first and second embodiments of the present invention.
Figure 5B:
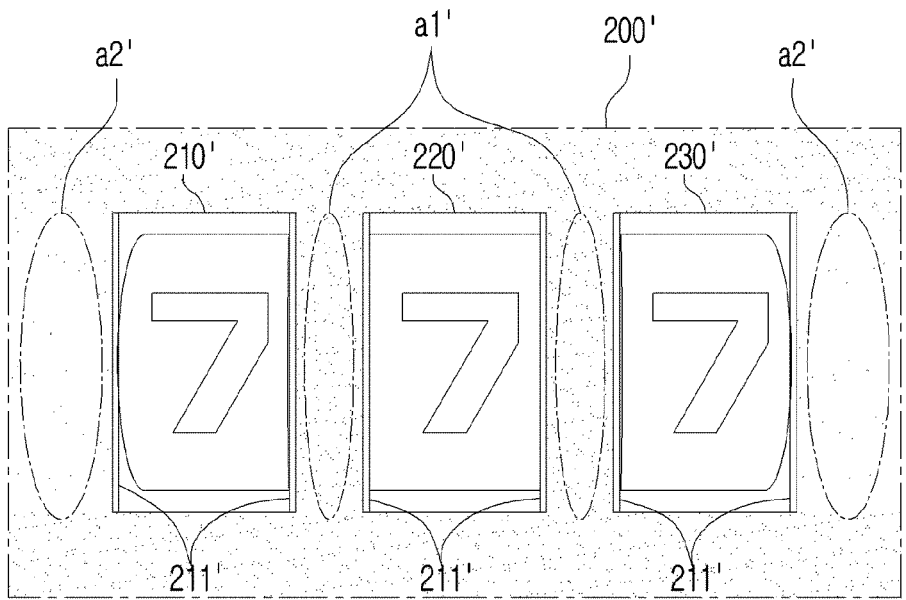
Figure 5C:
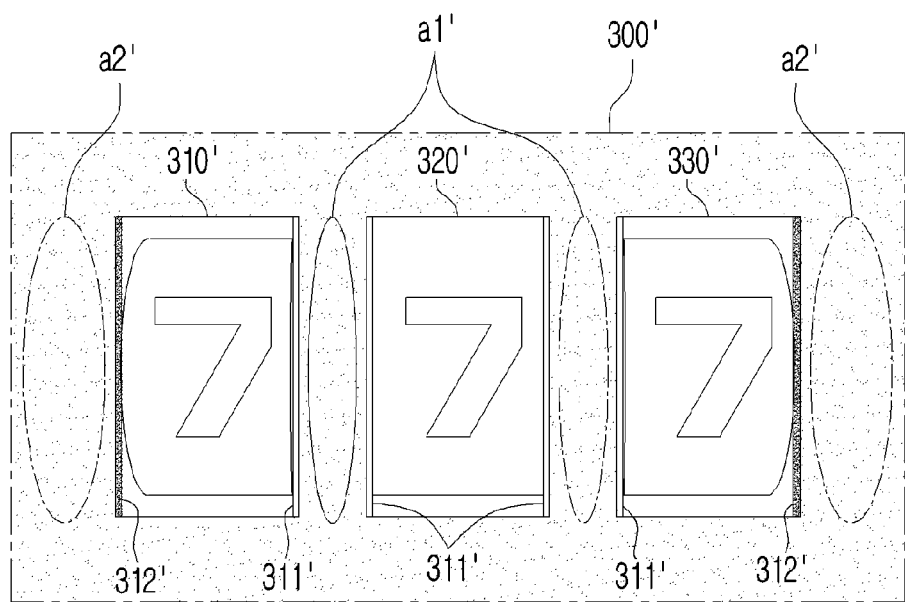

FIGS. 5A to 5C are views illustrating use examples of display modules having the light guide panels according to the first and second embodiments of the present invention. An example in which the operation state of a reel game machine is displayed when the reel game machine is located at the rear of each of the display modules having the light guide panels according to the first and second embodiments of the present invention applied thereto will be described while comparing with a conventional case.

FIG. 5A shows a use example of a display module 100' having a conventional light guide panel. Referring to FIG. 5A, it can be seen that, for the conventional display module 100' having three transmission portions 110', 120', and 130', an area a1' between the transmission portions 110', 120', and 130' is darker than other areas.

FIG. 5B is a view showing a use example of a display module 200' having the light guide panel illustrated in FIG. 3 applied thereto. Referring to FIGS. 3 and 5B, it can be seen that, when the predetermined member 211 is attached to at least one of the inner surfaces of the backlight transmission portions 210, 220, and 230 formed in the light guide panel 200, wherein the predetermined member 211 is attached to both the left/right inner surfaces of each of the backlight transmission portions 210, 220, and 230, as in the first embodiment of the present invention, display areas 210', 220', and 230' configured to display the operation state of the reel game machine located at the rear of the display module 200' and areas a1' and a2' around the display areas 210', 220', and 230' are not darker than the other areas. In the first embodiment of the present invention, as described above, it is possible to solve a problem in that brightness of the screen around the cutting areas is reduced as the result of cutting a part of the light guide panel 200.

In this case, however, it can be seen that the left/right areas a2' of the display areas 210', 220', and 230' (i.e. the left side of the display area 210' and the right side of the display area 230') are excessively brightened.

FIG. 5C, which is a view showing a use example of a display module capable of solving the problem in that the excessively brightened areas are generated, as described above, shows a use example of a display module 300' having the light guide panel illustrated in FIG. 4 applied thereto. Referring to FIGS. 4 and 5C, it can be seen that, when the first and second members 311 and 312 having different properties in which the first and second members react to light are optionally attached to the inner surface of each of the backlight transmission portions 310, 320, and 330 formed in the light guide panel 300, wherein the first member 311 having a property in which both surfaces of the first member reflect light is attached to the area a1 between the backlight transmission portions 310, 320, and 330 and the second member 312 having a property in which one surface of the second member reflects light and the other surface of the second member offsets the reflected light is attached to the outside area a2 of each of the backlight transmission portions 310 and 330 adjacent to the left/right light emission portions, brightness of the left/right areas a2' of the display areas 310', 320', and 330' configured to display the operation state of the reel game machine located at the rear of the display module 300' (i.e. the left side of the display area 310' and the right side of the display area 330') is similar to brightness of the other areas. In the second embodiment of the present invention, as described above, it is possible to solve a problem that may occur when the first embodiment of the present invention is applied, i.e. a problem in that a specific area is excessively brightened.

Figure 6:
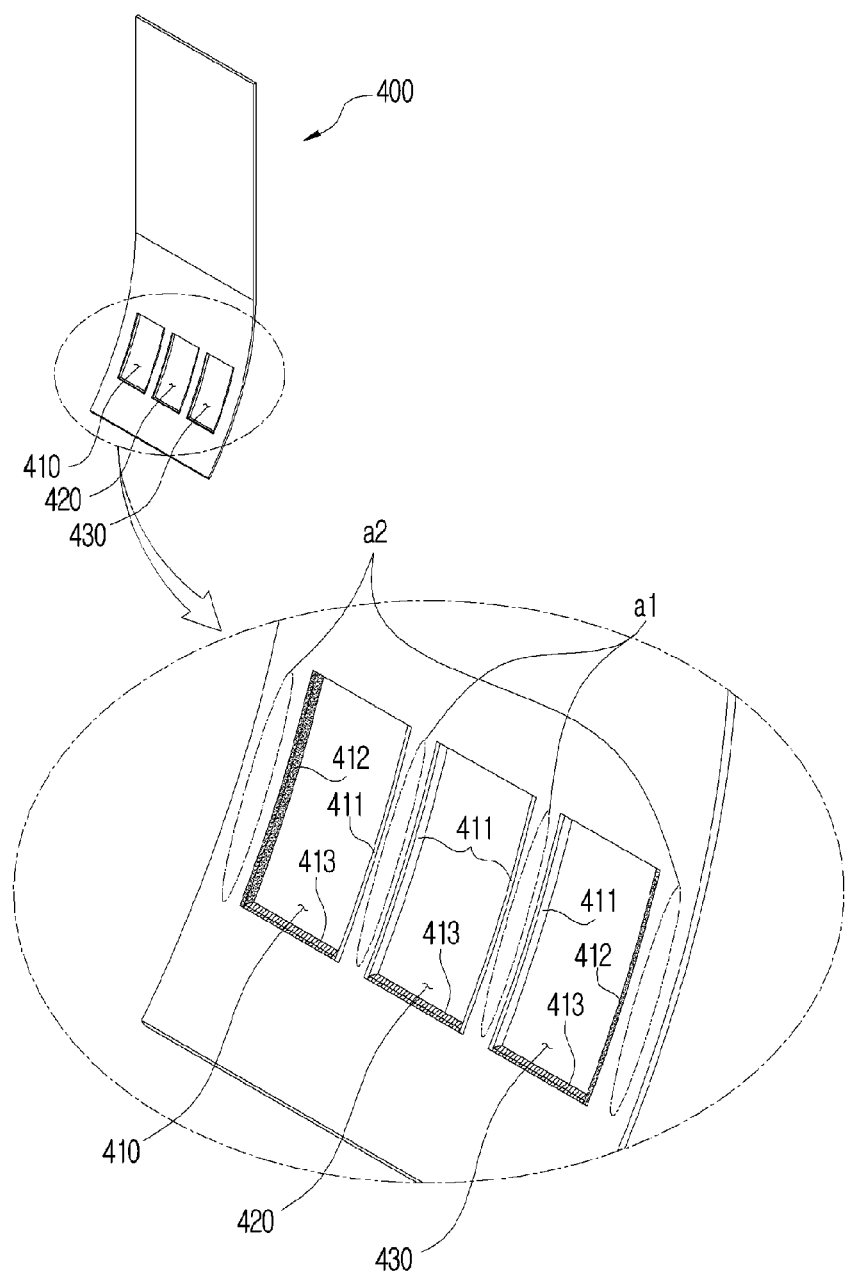
FIG. 6 is a perspective view showing a light guide panel according to a third embodiment of the present invention.

FIG. 6 is a perspective view showing a light guide panel according to a third embodiment of the present invention. Referring to FIG. 6, the light guide panel 400 according to the third embodiment of the present invention includes three backlight transmission portions 410, 420, and 430 disposed in a line, and first to third members 411 to 413 having different properties in which the first to third members react to light are optionally attached to each of inner surfaces thereof.

In order to solve a problem in that brightness of a transmission area of each of the backlight transmission portions 410, 420, and 430 and brightness of an area a1 between the backlight transmission portions 410, 420, and 430 become lower than brightness of the other areas, the first member 411 reflects light. In order to solve a problem in that an outside area a2 of each of the backlight transmission portions 410 and 430 adjacent to the left/right light emission portions is excessively brightened, the second member 412 reflects light to the transmission area of each of the backlight transmission portions 410 and 430 and offsets light reflected to the outside area a2. Also, in order to remove a hot spot generated at an adjacent area a3 through which, during a process in which light emitted from a light emission portion provided outside the light guide panel (particularly, under the light guide panel) is transmitted, the light is transmitted, the third member 413 diffuses the light.

At this time, the third member 413 may be implemented by a diffuser sheet configured to diffuse light.

Meanwhile, in FIG. 6, an example in which the third member 413 is attached to a lower part of each of the inner surfaces of the backlight transmission portions 410, 420, and 430 is shown; however, the attachment position of the third member 413 is not limited to the position illustrated in FIG. 6. That is, the third member 413 is attached to an inner surface adjacent to the position at which the hot spot is generated. When the hot spot is generated at an upper part of each of the backlight transmission portions 410, 420, and 430, the third member 413 may be attached to the upper part of each of the backlight transmission portions 410, 420, and 430.

In addition, the inner surface adjacent to the position at which the hot spot is generated may be etched, without attachment of a separate member, in order to remove the hot spot. In this case, it is possible to obtain the same effect.

Figure 7A:
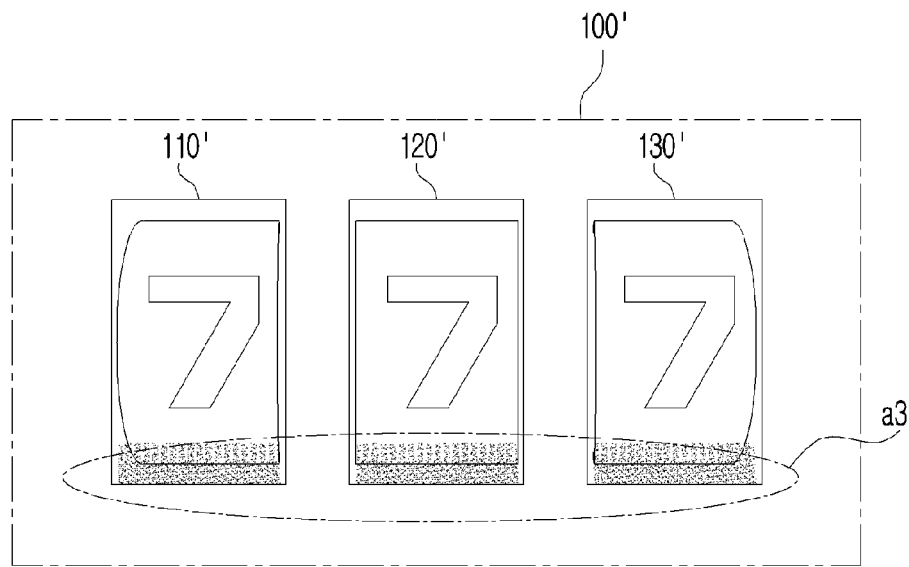
FIGS. 7A and 7B are views illustrating use examples of a display module having the light guide panel according to the third embodiment of the present invention.
Figure 7B:
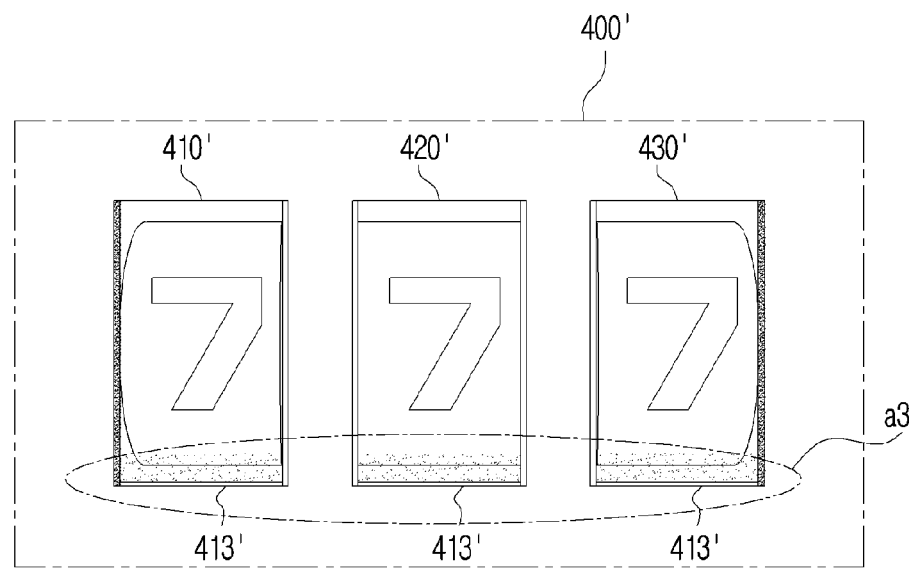

FIGS. 7A and 7B are views illustrating use examples of a display module having the light guide panel according to the third embodiment of the present invention. An example in which the operation state of a reel game machine is displayed when the reel game machine is located at the rear of the display module having the light guide panel according to the third embodiment of the present invention applied thereto will be described while comparing with a conventional case.

FIG. 7A shows a use example of a display module 100' having a conventional light guide panel having transmission portions. In particular, FIG. 7A shows an example in which, when light is incident from a light emission portion located under the conventional light guide panel, a hot spot is generated at a lower part a3 of each of transmission portions 110', 120', and 130' included in the display module 100'

FIG. 7B, which is a view showing a use example of the display module from which the hot spot has been removed, shows a use example of a display module 400' having the light guide panel illustrated in FIG. 6 applied thereto. Referring to FIGS. 6 and 7B, it can be seen that, when the third member 413 is attached to the lower part of each of the inner surfaces of the backlight transmission portions 410, 420, and 430 or the lower part is etched, as in the third embodiment of the present invention shown in FIG. 6, it is possible to remove the hot spot.

Figure 8:
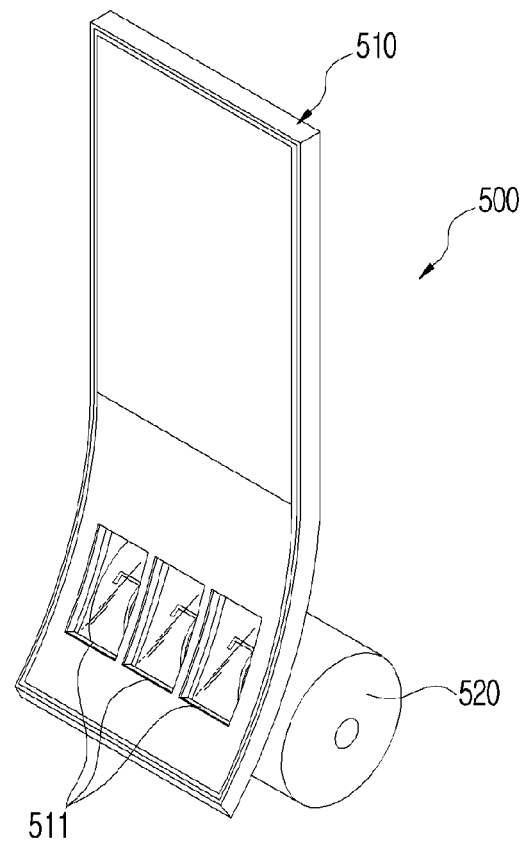
FIG. 8 is a schematic perspective view showing a game machine having a display module having transmission portions according to an embodiment of the present invention.

FIG. 8 is a schematic perspective view showing a game machine having a display module having transmission portions according to an embodiment of the present invention. Referring to FIG. 8, the game machine 500 according to the embodiment of the present invention includes a display module 510 having transmission portions and a real game unit 520 configured to execute a game.

The real game unit 520 may be moved according to mechanical operation in order to execute the game.

In FIG. 8, the case in which the real game unit 520 is a reel unit of a reel game machine is shown; however, the real game unit 520 may be implemented in various forms capable of executing the game.

The reel unit 520 shown in the figure may be configured such that numbers or figures are printed on the circumference of each of a plurality of rotary reels, and the game may be executed in the manner in which the plurality of rotary reels that are being rotated is arbitrarily stopped and points are awarded based on the numbers or the figures seen from the front.

The real game unit 520 may be may be located at the rear of the display module 510 including the plurality of transmission portions 511 such that, when a gamer looks at the display module 510, the real game unit is visible through the transmission portions 511. Consequently, the gamer may play the game using an image displayed on the display module 510 and the real game unit 520 seen through the transmission portions 511.

The game machine 500 having the display module 510 having the transmission portions 511 according to the embodiment of the present invention may include a manipulation mechanism.

A manipulation signal may be generated from the manipulation mechanism through direct manipulation of the gamer such that the game is executed.

The manipulation mechanism may be implemented by a button or a joystick. Alternatively, the manipulation mechanism may also be implemented by a touch panel disposed so as to overlap the display module 510 having the transmission portions in order to generate a touch signal.

In this case, the gamer may manipulate the manipulation mechanism to play the game while looking at the image displayed on the display module 510 and the real game unit 520 seen through the transmission portions 511.

Consequently, it is possible for the gamer to enjoy a more realistic game through the game machine 500 according to the present invention. Also, in the present invention, it is possible to solve a problem in that brightness of the display areas of the transmission portions 511 and brightness of the areas around the transmission portions 511 are reduced, whereby it is possible for a user to focus on the game.

Although the embodiment of the present invention has been described above, the scope of right of the present invention is not limited thereto and includes all alterations and modifications within a range easily changed and recognized as being equivalent by a person having ordinary skill in the art to which the present invention pertains from the embodiment of the present invention.

The invention claimed is:

1. A light guide panel having a transmission portion, wherein
the light guide panel comprises at least one cutting area configured to implement the transmission portion,
a predetermined member configured to react to light is attached to at least one of inner surfaces of the cutting area, and
a plurality of cutting areas arranged in a line,
wherein a first member configured to prevent a reduction in brightness of light is attached to a first inner surface of each of the cutting areas adjacent to another cutting area, among inner surfaces of the cutting areas, and
the first member is formed of any one of a tape, a sheet, and a film each having a material having a color configured to reflect light applied to opposite surfaces thereof,
wherein a second member configured to react to light is attached to a second inner surface of each of the cutting areas not adjacent to the other cutting area, among the inner surfaces of the cutting areas, and the second member is formed of any one of a tape, a sheet, and a film each having a material having a color configured to reflect light applied to one surface thereof that faces the cutting area and a material having a color configured to offset light applied to the other surface thereof.

2. The light guide panel according to claim 1, wherein a diffuser sheet configured to remove a hot spot generated when light emitted from a light emission portion provided outside the light guide panel is transmitted through the inner surface of each of the cutting areas is attached to at least one of the inner surfaces of the cutting areas.

3. The light guide panel according to claim 1, wherein at least one of the inner surfaces of the cutting areas is etched to remove a hot spot generated when light emitted from a light emission portion provided outside the light guide panel is transmitted through the inner surface of each of the cutting areas.

4. A display module comprising:
a display panel configured to display an image;
a polarization portion attached to the display panel, the polarization portion being configured to optionally transmit light depending on a vibration direction thereof, the polarization portion comprising at least one first cutting area cut such that a rear of the display panel is seen through the first cutting area; and
a backlight unit configured to provide light to the display panel, the backlight unit comprising a second cutting area cut so as to correspond to the first cutting area such that the rear of the display panel is seen through the second cutting area, wherein
the backlight unit comprises a light guide panel,
the light guide panel comprises at least one third cutting area corresponding to the first and second cutting areas, and
a predetermined member configured to react to light is attached to at least one of inner surfaces of the third cutting area,
wherein the light guide panel comprises:
a plurality of third cutting areas arranged in a line,
a first member configured to prevent a reduction in brightness of light is attached to a first inner surface of each of the third cutting areas adjacent to another third cutting area, among inner surfaces of the third cutting areas, and
the first member is formed of any one of a tape, a sheet, and a film each having a material having a color configured to reflect light applied to opposite surfaces thereof,
wherein the light guide panel is configured such that a second member configured to react to light is attached to a second inner surface of each of the third cutting areas not adjacent to the other third cutting area, among the inner surfaces of the third cutting areas, and
the second member is formed of any one of a tape, a sheet, and a film each having a material having a color configured to reflect light applied to one surface thereof that faces the cutting area and a material having a color configured to offset light applied to the other surface thereof.

5. The display module according to claim 4, wherein the light guide panel is configured such that a diffuser sheet configured to remove a hot spot generated when light emitted from a light emission portion provided outside the light guide panel is transmitted through the inner surface of each of the third cutting areas is attached to at least one of the inner surfaces of the cutting areas.

6. The display module according to claim 4, wherein the light guide panel is configured such that at least one of the inner surfaces of the cutting areas is etched to remove a hot spot generated when light emitted from a light emission portion provided outside the light guide panel is transmitted through the inner surface of each of the third cutting areas.

7. A game machine comprising:
a display module comprising: a display panel configured to display an image; a polarization portion attached to the display panel, the polarization portion being configured to optionally transmit light depending on a vibration direction thereof, the polarization portion comprising at least one first cutting area cut such that a rear of the display panel is seen through the first cutting area; and a backlight unit configured to provide light to the display panel, the backlight unit comprising a second cutting area cut so as to correspond to the first cutting area such that the rear of the display panel is seen through the second cutting area; and
a real game unit located at the rear of the display module, the real game unit being configured to provide a real game through the first cutting area of the polarization portion, wherein
the backlight unit comprises a light guide panel,
the light guide panel comprises at least one third cutting area corresponding to the first and second cutting areas, and
a predetermined member configured to react to light is attached to at least one of inner surfaces of the third cutting area,
wherein the light guide panel comprises:
a plurality of third cutting areas arranged in a line,
a first member configured to prevent a reduction in brightness of light is attached to a first inner surface of each of the third cutting areas adjacent to another third cutting area, among inner surfaces of the third cutting areas, and
the first member is formed of any one of a tape, a sheet, and a film each having a material having a color configured to reflect light applied to opposite surfaces thereof,
wherein the light guide panel is configured such that a second member configured to react to light is attached to a second inner surface of each of the third cutting areas not adjacent to the other third cutting area, among the inner surfaces of the third cutting areas, and
the second member is formed of any one of a tape, a sheet, and a film each having a material having a color configured to reflect light applied to one surface thereof that faces the cutting area and a material having a color configured to offset light applied to the other surface thereof.

8. The game machine according to claim 7, wherein the light guide panel is configured such that a diffuser sheet configured to remove a hot spot generated when light emitted from a light emission portion provided outside the light guide panel is transmitted through the inner surface of each of the third cutting areas is attached to at least one of the inner surfaces of the cutting areas.

9. The game machine according to claim 7, wherein the light guide panel is configured such that at least one of the inner surfaces of the cutting areas is etched to remove a hot spot generated when light emitted from a light emission portion provided outside the light guide panel is transmitted through the inner surface of each of the third cutting areas.

* * * * *